US012746719B2

(12) United States Patent
Gockowski et al.

(10) Patent No.: US 12,746,719 B2
(45) Date of Patent: Sep. 29, 2026

(54) SYSTEM AND METHOD FOR ADDITIVE MANUFACTURING OF AN OBJECT WITH FOAM INFILL MATERIAL

(71) Applicant: ACCENTURE GLOBAL SOLUTIONS LIMITED, Dublin (IE)

(72) Inventors: Luke Fabrice Gockowski, Oakland, CA (US); Lavinia Andreea Danielescu, Seattle, WA (US); Noah Gideon Pacik-Nelson, San Francisco, CA (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 81 days.

(21) Appl. No.: 18/952,720

(22) Filed: Nov. 19, 2024

(65) Prior Publication Data

US 2026/0138332 A1 May 21, 2026

(51) Int. Cl.
*B29C 44/02* (2006.01)
*B29C 44/04* (2006.01)
(Continued)

(52) U.S. Cl.
CPC ........ *B29C 64/336* (2017.08); *B29C 44/0492* (2013.01); *B29C 64/393* (2017.08);
(Continued)

(58) Field of Classification Search
CPC ..... B29C 44/02; B29C 44/04; B29C 44/0492; B29C 44/36; B29C 44/38; B29C 44/60;
(Continued)

(56) References Cited

U.S. PATENT DOCUMENTS

2009/0014907 A1* 1/2009 Kuo ........................ B33Y 80/00 264/220
2015/0321418 A1* 11/2015 Sterman ................ B29C 64/393 264/210.1

(Continued)

FOREIGN PATENT DOCUMENTS

EP 2149436 A1 * 2/2010 ............... B26D 7/18
WO WO-2024000033 A1 * 1/2024 ........... B29C 64/209

OTHER PUBLICATIONS

Gianni Stano, S M Al Islam Ovy, Jakob Ryan Edwards, Matteo Cianchetti, Gianluca Percoco, Yonas Tadesse, One-shot additive manufacturing of robotic finger with embedded sensing and actuation, Springer, The International Journal of Advanced Manufacturing Technology, Nov. 23, 2022, pp. 467-485.

*Primary Examiner* — Leo B Tentoni
(74) *Attorney, Agent, or Firm* — Mannava & Kang, P.C.

(57) ABSTRACT

System and method for additive manufacturing of an object with foam infill material is disclosed. The method includes, determining a shell portion of the object using a three-dimensional model of the object, determining one or more locations in the shell portion for providing access to an interior of the shell portion, determining a foam infill material for additive manufacturing based on one or more fill material characteristics, and determining an amount of the foam infill material needed to fill the interior of the shell portion. The method further includes, fabricating the shell portion of the object, depositing the amount of foam infill material at the one or more determined locations to fill the interior of the shell portion, and fabricating the shell portion of the object to complete fabrication of the object.

20 Claims, 6 Drawing Sheets

(51) Int. Cl.

| | |
|---|---|
| ***B29C 44/36*** | (2006.01) |
| ***B29C 44/38*** | (2006.01) |
| ***B29C 44/60*** | (2006.01) |
| ***B29C 64/106*** | (2017.01) |
| ***B29C 64/112*** | (2017.01) |
| ***B29C 64/118*** | (2017.01) |
| ***B29C 64/147*** | (2017.01) |
| ***B29C 64/153*** | (2017.01) |
| ***B29C 64/165*** | (2017.01) |
| ***B29C 64/209*** | (2017.01) |
| ***B29C 64/336*** | (2017.01) |
| ***B29C 64/393*** | (2017.01) |
| ***G01B 11/14*** | (2006.01) |
| *B33Y 10/00* | (2015.01) |
| *B33Y 30/00* | (2015.01) |
| *B33Y 40/00* | (2020.01) |
| *B33Y 50/02* | (2015.01) |

(52) U.S. Cl.
CPC ............... *B33Y 10/00* (2014.12); *B33Y 30/00* (2014.12); *B33Y 40/00* (2014.12); *B33Y 50/02* (2014.12)

(58) Field of Classification Search
CPC ... B29C 64/106; B29C 64/112; B29C 64/118; B29C 64/147; B29C 64/153; B29C 64/165; B29C 64/209; B29C 64/336; B29C 64/386; B29C 64/393; B33Y 10/00; B33Y 30/00; B33Y 50/00; B33Y 50/02; G01B 11/14
USPC ..... 264/40.1, 46.4, 46.6, 255, 308; 425/110, 425/135, 215, 375; 356/614
See application file for complete search history.

(56) References Cited

U.S. PATENT DOCUMENTS

2019/0030818 A1* 1/2019 Herman ................. B33Y 50/02
2023/0226748 A1* 7/2023 Sharma .................. B33Y 10/00 428/12
2024/0307964 A1* 9/2024 Issari ..................... B33Y 10/00

* cited by examiner

SYSTEM AND METHOD FOR ADDITIVE MANUFACTURING OF AN OBJECT WITH FOAM INFILL MATERIAL

TECHNNICAL FIELD

The present disclosure generally relates to the field of manufacturing an object, and more particularly to a system and a method for additive manufacturing of an object with foam infill material.

BACKGROUND

Additive manufacturing, often referred to as three-dimensional (3D) printing is the construction of a 3D object using a computer-aided design (CAD) model or a digital 3D model. The most common type of 3D printing is fused deposition modeling (FDM), which involves the layer-by-layer deposition of material to form a 3D object. That is, the FDM 3D printer works by depositing melted filament material over a build platform layer by layer in a predetermined path to form the physical object. The FDM uses a digital design file that is uploaded to the printer itself and translates the digital file into physical dimensions. Materials for FDM include polymers such as Acrylonitrile butadiene styrene (ABS), Polylactic acid (PLA), Polyethylene terephthalate glycol (PETG) and Polyethylenimine (PEI), which the machine feeds as threads through a heated nozzle.

In the field of 3D printing, a significant portion of the print time is dedicated to creating the infill which is the internal lattice structure that provides strength and support to the outer shell of the part. This infill process, which involves depositing material layer by layer, often consumes excessive time and resources, leading to increased production times and costs. As the demand for faster and more efficient 3D printing processes grows, there is a pressing need to address the inefficiencies associated with infill deposition.

SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

A method for additive manufacturing of an object is disclosed. The method includes, determining the shell portion of the object using a three dimensional model (3D) of the object, determining one or more locations in the shell portion for providing access to an interior of the shell portion, determining a foam infill for additive manufacturing based on one or more foam infill material characteristics, determining an amount of the foam infill needed to fill the interior of the shell portion, fabricating the shell portion of the object, depositing the amount of foam infill at the one or more determined locations to fill the interior of the shell portion, and fabricating the shell portion of the object to complete fabrication of the object.

Further disclosed is a system for additive manufacturing of an object. The system includes a first nozzle to deposit body material to form a shell portion of the object, a second nozzle to deposit foam infill inside an interior of the shell portion of the object, and a processor communicatively connected to a memory storing instructions. The instructions when executed by the processor, cause the processor to determine the shell portion of the object using the 3D model of the object, determine one or more locations in the shell portion for providing access to the interior of the shell portion, determine a foam infill material for additive manufacturing based on one or more foam infill material characteristics, determine an amount of the foam infill material needed to fill the interior of the shell portion, fabricate the shell portion of the object, deposit the amount of foam infill material at the one or more determined locations to fill the interior of the shell portion, and fabricate the shell portion of the object to complete fabrication of the object. The system may further include a material removal arm to remove excess foam infill material, a camera to provide positioning information associated with the first nozzle and the second nozzle and to enable quality control measures, a display component to display data associated with fabrication of the object; and a nozzle control unit to operate the first nozzle and the second nozzle for manufacturing the object.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various embodiments in accordance with the present disclosure will be described with reference to the drawings, in which.

Like reference numbers and designations in the various drawings indicate like elements.

DETAILED DESCRIPTION

Figure 1:
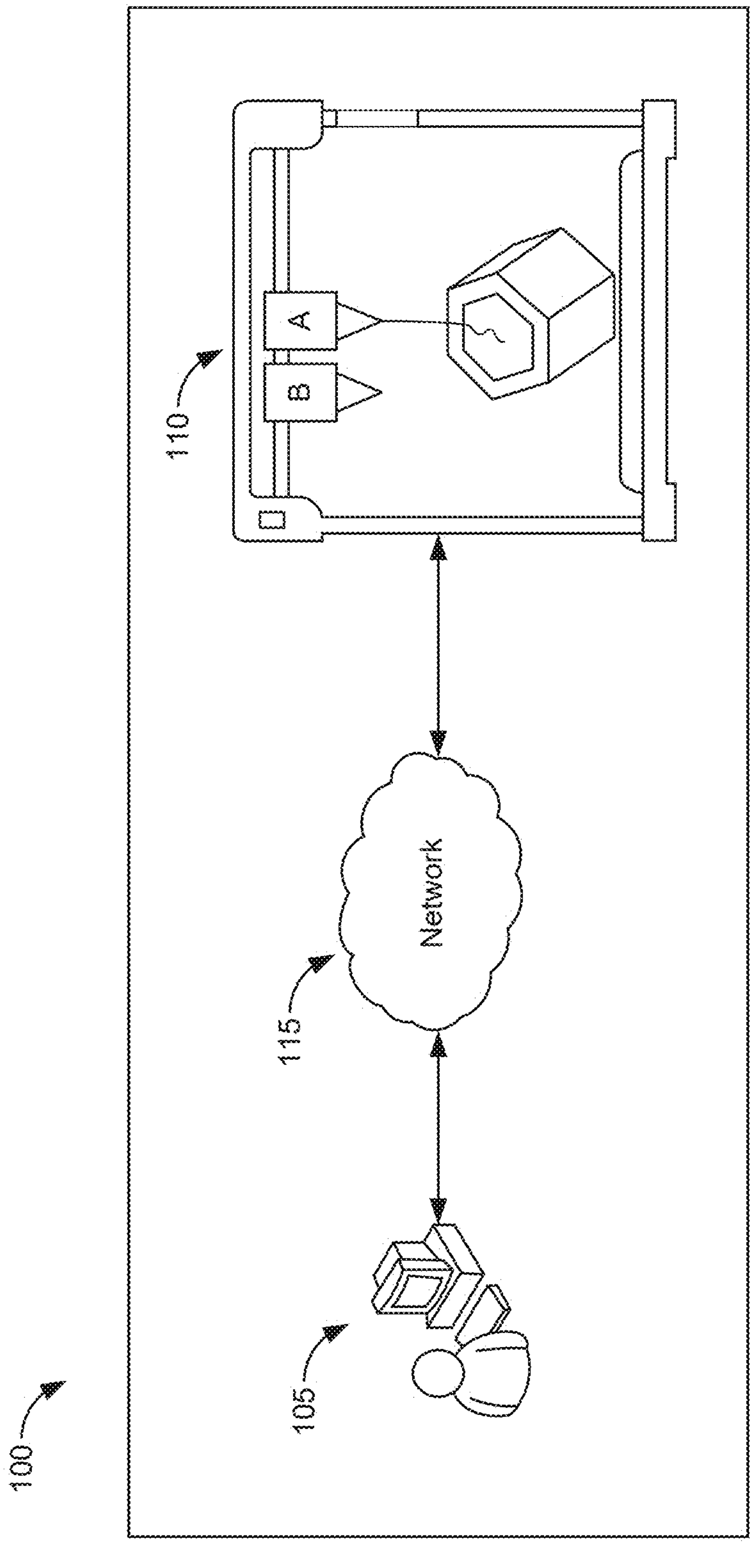
FIG. 1 depicts a schematic view of an exemplary additive manufacturing system for manufacturing of an object, in accordance with an embodiment of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A. and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

Embodiments of the present disclosure disclose a system and a method for additive manufacturing of an object, wherein the system and method facilitate one-shot or multi-shot deposition of foam infill material during the manufacturing of the object. The foam infill material may be or include for example a biodegradable foam or a conductive foam or other. The term 'additive manufacturing' as described in the present disclosure refers to 'three-dimensional printing' (3D printing) and the two terms are used interchangeably throughout the present disclosure.

FIG. 1 depicts a schematic view of an exemplary additive manufacturing system for manufacturing of an object, in accordance with an embodiment of the present disclosure. As shown, the system 100 includes a computing device 105 and a 3D printing device 110, wherein the computing device 105 and the 3D printing device 110 may be communicatively connected through a network 115. The network 115 may include any wired or wireless or combination of wired and wireless provisions that facilitate the exchange of information between the computing device 05 and the 3D printing device 110. It should be noted that the computing device 105 may be implemented as a part of the printing device 110. That is, the printing device 110 may include necessary hardware elements for enabling printing of an object and the 3D model of the object may be inputted to the printing device 110, for example using a Universal Serial Bus (USB) drive. However, a computing device 105 is shown separately for the sake of explanation and understanding.

In the depicted example, the computing device 105 is depicted as a desktop computing device. It is contemplated, however, that implementations of the present disclosure can be realized with any appropriate type of computing device (e.g., tablet, laptop computer, server). Any of these resources can be operated by one or more human users. In one embodiment, the computing device 105 is configured for controlling and/or communicating with the 3D printing device 110 for printing an object.

The 3D printing device 110 may employ various techniques of three-dimensional printing. 3D printing involves several technologies that create three-dimensional objects by layering materials on top of each other. Examples of 3D printing methods include, but are not limited to, fused filament fabrication (FFF) or fused deposition molding (FDM), electron beam freeform fabrication (EBF), direct metal laser sintering (DMLS), electron beam melting (EBM), and laminated object manufacturing (LOM), as well as other 3D printing and additive manufacturing techniques known in the field.

The 3D printing device 110 may include a housing (Constrained Build Volume) that supports various systems, devices, components or other provisions that facilitate the 3D printing of objects, for example, parts, components, or structures. Although the exemplary embodiment depicts the housing, other embodiments could use one or more robotic arms (Unconstrained Build Volume) that facilitates 3D printing of the objects. In some embodiments, the 3D printing device 110 may include provisions to retain or hold the printed object. For example, the 3D printing device 110 may include a table, platform, tray or similar component to support, retain and/or hold a printed object or an object onto which printed material is being applied.

Figure 2:
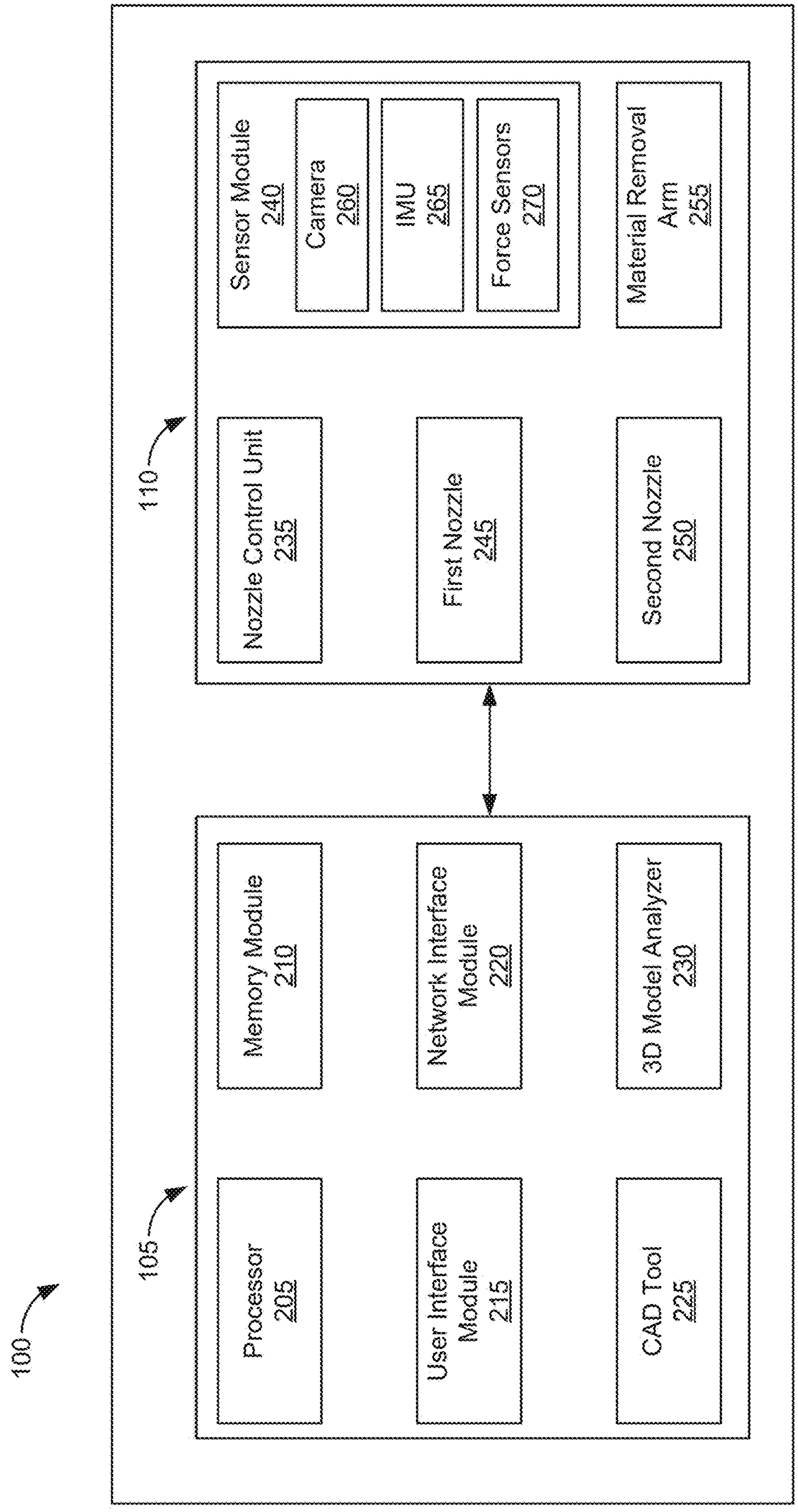
FIG. 2 depicts a block diagram of the additive manufacturing system, in accordance with an embodiment of the present disclosure.

FIG. 2 depicts a block diagram of the additive manufacturing system, in accordance with an embodiment of the present disclosure. As shown, the computing device 105 includes a processor 205, a memory module 210, a user interface module 215, a network interface module 220, a computer-aided design (CAD) tool 225 and a 3D model analyzer 230. The 3D printing device 110 includes a nozzle control unit 235, a sensor module 240, a first nozzle 245, a second nozzle 250 and a material removal arm 255. As described, the components of the computing device 110 may be implemented with the 3D printing device 110. It is important to note that the 3D printing device 110 shown in FIG. 2 includes two nozzles, the first nozzle 245 deposits body material to form the shell portion of the object, while the second nozzle 250 deposits foam infill material inside the interior of the shell. However, the 3D printing device 110 may also include more than two nozzles. For example, the 3D printing device 110 may include a third nozzle for depositing conductive foam, and a fourth for conductive Polylactic Acid (PLA).

The memory module 210 may include one or more storage devices including but not limited to magnetic, optical, magneto-optical, and/or memory, including volatile memory and non-volatile memory devices. In one embodiment, the memory module 210 stores instructions to be processed by the processor 205, wherein the instructions when processed by the processor 05 causes the processor 205 to perform one or more operations for printing the object of interest.

The user interface module 215 includes one or more input/output devices including but not limited to keyboard, touchscreen interface, and a display unit, which facilitates interactions with the system 100. Further, the network interface module 220 facilitates communication between the computing device 105 and the 3D printing device 110 through the network 115.

The CAD tool 225 assists the user in creating a three-dimensional model (3D model) of an object. Further, the CAD tool 225 facilitates the user in modifying, analyzing, or optimizing a 3D design for printing the object. The 3D model includes information about the geometry of the structure of the object and may also include information related to the materials required to print various portions of the object. The output of the CAD tool 225 is the 3D model of the object and the 3D model is used to manufacture the object. That is, the 3D model generated by the CAD tool 225 is then outputted to a slicer program, which converts the 3D model to g-code (an instruction set that the 3D printing device 110 will follow). The instructions may be sent over to the printing device 110 (either wirelessly or uploaded via USB, memory cards, or any such devices capable of storing data) for the printing device 110 to print the object.

In one embodiment of the present disclosure, the 3D model analyzer 230, which may be implemented by the processor 205, determines the shell portion of the object using the 3D model of the object and determines one or more locations in the shell portion for providing access to an interior of the shell portion. The shell portion is generally the external boundary of the 3D object. In one embodiment, the 3D model analyzer 230 uses a sectioning tool which cuts the 3D model at one or more locations, creates cross-sections of the 3D model and examines the internal and external layers. In another embodiment, the 3D model analyzer 230 uses a slicing tool which identifies the shell portion of the object and converts the virtual 3D object into instructions (geometric code) for 3D printing. Hence, the input to the slicing tool is the 3D model in standard file format, for example, STL, and the slicing tool converts the 3D model into a series of horizontal layers or non-planar printing paths and generates instructions for 3D printing. In one embodiment, the slicing tool generates a first set of spatial movement instructions for the 3D printing device 110 to fabricate the shell portion of the object.

In one embodiment of the present disclosure, the 3D model analyzer 230 identifies one or more locations in the shell portion for providing access to the interior of the shell portion and provides locations as an option to the user through the user interface module 215, thereby enabling the user to select one or more locations. It is to be noted that the 3D model analyzer 230 is configured to identify one or more optimal locations based on the 3D model of the object. However, identifying one or more locations and providing the options to the user is an optional step. In another embodiment, the locations are identified, and a time at which the foam infill material needs to be deposited is also determined. The time refers to an intermediate process completion time (for example after completing 50% of manufacturing the object). Upon receiving the selection, the 3D model analyzer 230 generates a second set of spatial movement instructions for the 3D printing device 110 to deposit the foam infill material inside the interior of the object shell portion.

Further, in one embodiment of the present disclosure, the processor 205 determines a foam infill material for additive manufacturing based on one or more foam infill material characteristic. The one or more foam infill material characteristics may include weight of the foam infill material, an expansion ratio of the foam infill material, the conductive characteristics of the foam infill material, the self-healing characteristics of the foam infill material, and the biodegradable characteristics of the foam infill material. In one embodiment, the foam infill material is selected based on one or more parameters of the object, wherein the one or more parameters include but are not limited to the type of the object, size and shape of the object, desired weight of the object, etc. In a second embodiment of the present disclosure, a user may select the foam infill material and the computing device 105 may include a database of options for the user to pick from, with the properties defined for each material. Alternatively, the user may specify the foam infill material and associated properties, for example the expansion ratio. In such an implementation, the processor 205 determines an amount of the foam infill material needed to fill the interior of the shell portion based on the selected foam infill material and the expansion ratio.

Furthermore, the processor 205 determines an amount of the foam infill material needed to fill the interior of the shell portion. In one embodiment, the processor 205 initially determines a volume of the interior of the shell portion of the object using the determined shell portion and the 3D model of the object. Based on the volume and the expansion rate of the selected foam infill material, the processor 205 determines the amount of foam infill material needed to fill the interior of the shell portion of the object. The expansion rate is the factor by which the foam infill material expands once the material is applied or filled. For example, if a material expands to 10 times the original volume, the expansion ratio is 1:10. Then the amount of the foam infill material needed to fill the interior of the shell portion is determined as a ratio of the volume of the interior to the expansion rate of the material. For example, considering a shell portion having an interior volume of 30 cc and the foam infill material having an expansion ratio of 1:10, then 3 cc of foam infill material is used to fill the interior volume of the shell portion.

Referring to FIG. 2, the nozzle control unit 235, the sensor module 340, the first nozzle 345, the second nozzle 350 and the material removal arm 355 may operate in cooperation with one another and with the components of the computing device 105 to facilitate the printing of the 3D object. It is to be noted that the 3D printing device 110 includes other elements such as motors, motor controllers, robotic arms, object holding platforms, heating elements, extrusion control systems, battery module, etc., which facilitate in 3D printing of the object. However, such elements are not shown in FIG. 2.

In one embodiment of the present disclosure, the first nozzle 345 is configured to deposit body material to form the shell portion of the object. During the process, the first nozzle 345 deposits the body material layer-by-layer to form the 3D object. The body material for FDM may include polymers such as Acrylonitrile butadiene styrene (ABS), Polylactic acid (PLA), Polyethylene terephthalate glycol (PETG) and Polyethylenimine (PEI), which the machine melts through a first nozzle 345. Further, the second nozzle 350 is configured to deposit foam infill material inside an interior of the shell portion of the object, wherein the foam infill material may be, or include foam.

In one embodiment of the present disclosure, the nozzle control unit 235 is configured to control the operations of the first nozzle 345 and the second nozzle 350 based on the first set of spatial movement instructions and the second set of spatial movement instructions respectively to fabricate the shell portion of the object and to fill the material inside the interior of the shell portion of the object. It is important to note that instructions for the first nozzle 345 and the second nozzle 350 may be generated simultaneously from the 3D model of the object to be printed, and then the instructions are interwoven. The nozzle control unit 235 allows for the motion of nozzles 245 and 250 in any direction, including both horizontal and vertical directions within the housing of the 3D printing device 110.

An optional sensor module 340 may include a camera 260, an Inertial Measurement Unit (IMU) 265 and force sensors 270, wherein the IMU 265 includes one or more accelerometers and gyroscopes for measuring acceleration, orientation, angular rates, and other gravitational forces. The sensors are configured to provide feedback to the nozzle control unit 235 in real-time, so that printing may be adjusted in real-time to achieve precise geometries and material characteristics for the printed object. In one embodiment, the camera 260 is configured to provide positioning information associated with the first nozzle 245 and the second nozzle 250 and hence to enable quality control measures. The quality control measures as described herein refers to a detection of deposition of an excess amount of foam infill material. The images captured by the camera 260 is analyzed in real-time to detect the deposition of excess amounts of foam infill material if any. Based on the detection, the nozzle control unit 235 is triggered to stop the deposition and the material removal arm 255 is activated and controlled to remove the excessive foam infill material. It is important to note that the sensor module 340 and described quality controlling components are optional elements of the system. Users may operate the system without these components, although their inclusion may enhance performance and quality.

Further the IMU 265 is configured to sense the movements of the first nozzle 245 and the second nozzle 250 to accurately position the first nozzle 245 and the second nozzle 250 at the desired position to print the object. The manner in which the excess foam infill material is removed, if any, is described in detail further below in the present disclosure.

As described, the system 100 determines the shell portion of the object using the 3D model of the object, determines the one or more locations in the shell portion for providing access to the interior of the shell portion, and determines the foam infill material for additive manufacturing based on one or more foam infill material characteristics. The system further determines the amount of the foam infill material needed to fill the interior of the shell portion based on the volume of the interior of the shell portion and the expansion rate of the foam infill material. Then the system uses the first nozzle 245 and the second nozzle 250 for fabricating the shell portion of the object and for depositing the amount of foam infill material inside the interior of the shell portion via the one or more fill holes, respectively. Upon filling the foam infill material, excess foam infill material, if any, is removed using the material removal arm 255. Then the system 100 uses the first nozzle 245 to finish fabricating the shell portion of the object. In some instances, to complete the fabrication of the object as described herein may refer to proceeding further with printing the object for completion. For example, an object may be printed in two stages. During the first stage, the 50% of the object (a first shell portion) is initially printed and then the foam infill material is disposed to fill the interior of the first shell portion. Then, the remaining 50% of the object is printed (a second shell portion) and the foam infill material is disposed to fill the interior of the second shell portion, thereby completing the manufacturing process. During such process, the foam infill material may provide structural support to the shell portion during the manufacturing.

Figure 3:
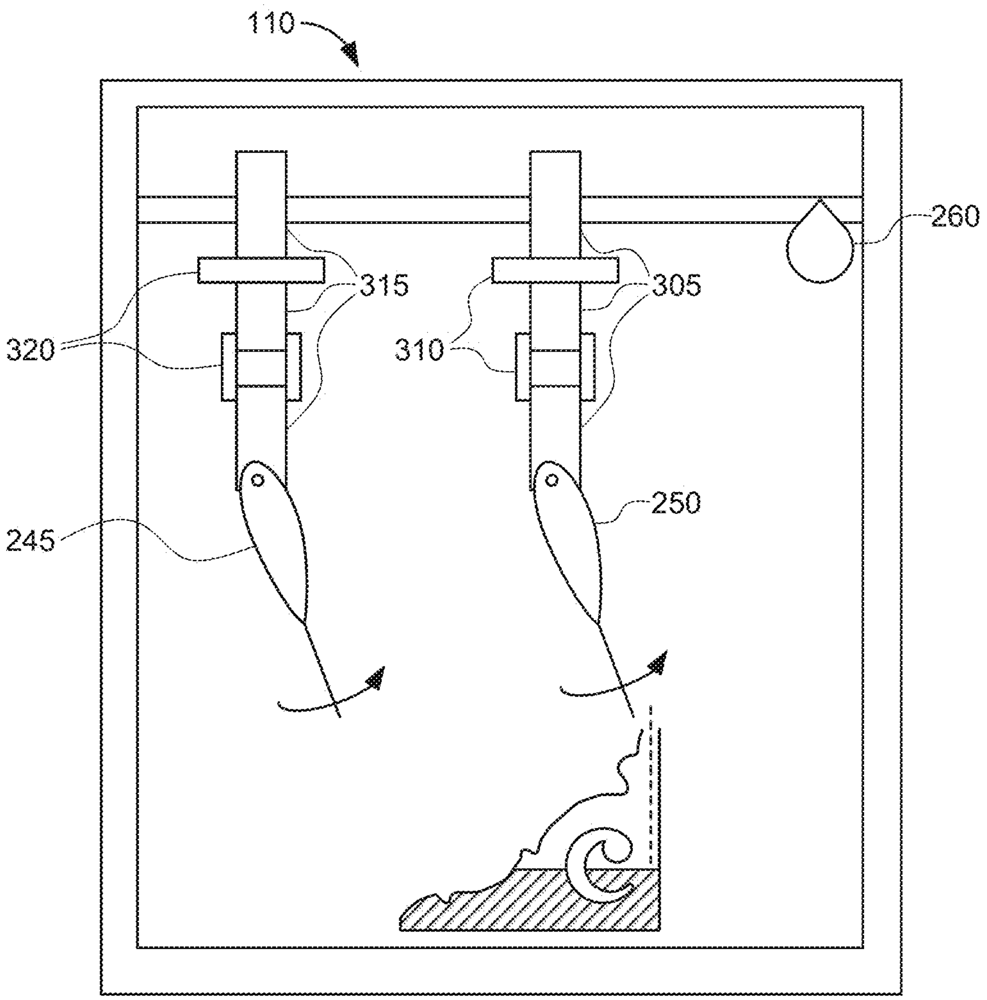
FIG. 3 depicts an exemplary 3D printing device, in accordance with an embodiment of the present disclosure.

FIG. 3 depicts an exemplary 3D printing device, in accordance with an embodiment of the present disclosure. As shown, the 3D printing device 110 includes the first nozzle 245 and the second nozzle 250 which are controlled using the nozzle control unit 235 based on the first set of spatial movement instructions and the second set of spatial movement instructions respectively. In one embodiment, the nozzles are operated using a plurality of arms and one or more electric motors and the arrangement provides three degrees of freedom. For example, the second nozzle 350 is operated using a plurality of arms 305 and one or more electric motors 310 and the arrangement provides three or more degrees of freedom for depositing the foam infill material inside the interior of the shell portion. Similarity, the first nozzle 345 is operated using a plurality of arms 315 and one or more electric motors 320 and the arrangement provides three or more degrees of freedom for depositing body material to form the shell portion. In one embodiment, one or more force sensors 270 are placed at or near the tip of the nozzles 245 and 250, wherein the force sensors 270 provide spatial feedback on the positions of the nozzles 245 and 250. In another embodiment, the one or more force sensors 270 may be placed in the nozzles or in the bed of the printing device 110. The force sensors 270 provide spatial feedback related to a position of the nozzles 345 and 350, with respect to the bed of the printing device 110 for example. The feedback facilitates the 3D printing device 110 in understanding the coordinate space for movement of the nozzles 345 and 350. In another embodiment, the camera may be configured to provide spatial feedback related to the position of the nozzles 345 and 350 during printing. Further, the camera 260 may be positioned to capture the images of the 3D printing area and the movements of the first and the second nozzles 245 and 250. In one embodiment, the camera 260 is configured to move relative to the movement of the nozzles 245 and 250.

Figure 4A:
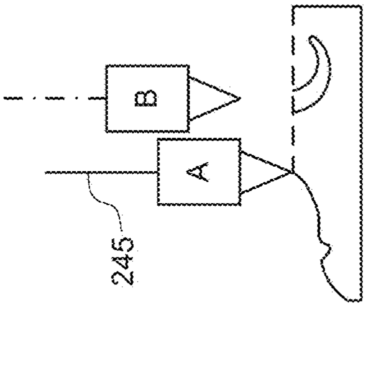
FIG. 4A to 4D depict a process flow of additive manufacturing of an object, in accordance with an embodiment of the present disclosure.
Figure 4B:
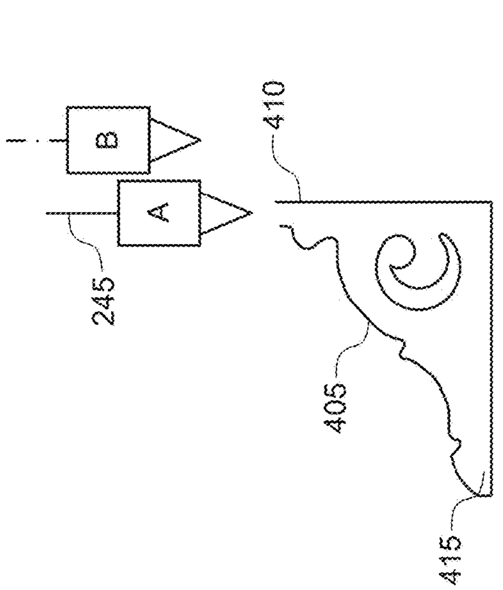

FIG. 4A to 4D depicts a process flow of additive manufacturing of an object, in accordance with an embodiment of the present disclosure. It is to be noted that the process flow depicts manufacturing the object at once, that is, manufacturing the shell portion of the object and then depositing the foam infill material. However, the process may be performed at two or more stages, as described above, to complete the manufacturing process. Initially, the 3D printing device 110 uses the first nozzle 245 to deposit the body material layer-by-layer as shown in FIG. 4A to form the shell portion 405 of the object shown in FIG. 4B. In one embodiment, a location 410 is identified in the shell portion 405 for providing access to an interior 415 of the shell portion 405 as shown in FIG. 4B. In one embodiment of the present disclosure, the location 410 is identified based on the shape of the object and size of the object to the manufactured. Further, one or more locations may be identified in the shell portion 405 for providing access to the interior 415 of the shell portion 405 during the process of manufacturing of the object.

Figure 4C:
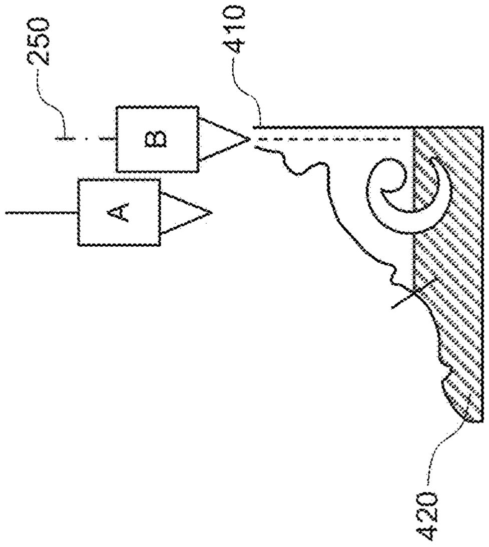
Figure 4D:
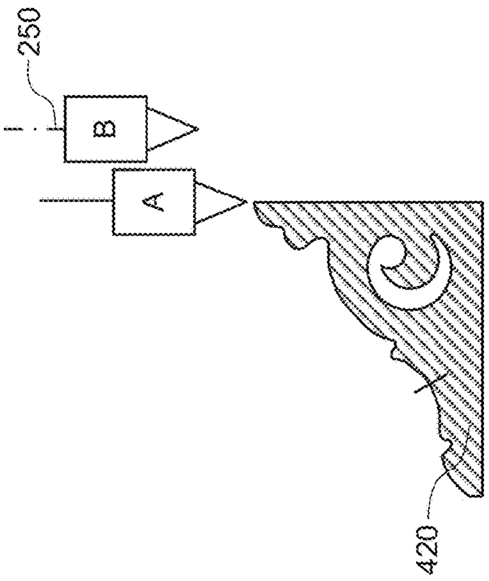

Upon forming the shell portion 405, the second nozzle 250 is aligned to the determined location 410 and the second nozzle 250 is used to deposit the predetermined amount of foam infill material 420 inside the interior 415 of the shell portion 405, as shown in FIG. 4C. Upon filling, the foam infill material expands to fill the interior 415 of the shell portion 405 and then the first nozzle 245 is used to complete fabrication of the object as shown in FIG. 4D. In the present example, the location 410 may be left with an aperture after the foam infill material and the first nozzle 245 is used close the aperture and to complete fabrication of the object. It is to be noted that the aperture may be closed even before the foam infill material expands.

As described with reference to FIG. 2, the 3D model analyzer 230 uses the slicing tool which identifies the shell portion of the object and converts the virtual 3D object into geometric code (G-code) for 3D printing. For example, the first set of spatial movement instructions (commands) are generated and used to operate the first nozzle 245 to fabricate the shell portion of the object. Further, the second set of spatial movement instructions are generated and used to operate the second nozzle 245 to deposit the foam infill material inside the interior of the object shell portion. In one embodiment of the present disclosure, upon generating the first set of spatial movement instructions, the first set of spatial movement instructions are modified to include the second set of spatial movement instructions to deposit the foam infill material inside the interior of the shell portion.

As described, the object is manufactured by forming the shell portion and by depositing foam infill material inside the interior of the shell portion of the object at the one or more predetermined locations. The disclosed method and system deposit the foam infill material in a single or in multiple steps after the respective shell portions have been formed. For example, depending on the object size, shape and complexity, the shell of the entire object can be formed at once and then the foam infill material is deposited at the one or more determined locations to fill the interior of the shell. Alternatively, the object may be manufactured in multiple steps. For example, a first shell portion of the object is manufactured, and the foam infill material is filled, and then the second, third and subsequent shell portions are manufactured, and the foam infill material is filled until the object is manufactured completely.

In one embodiment of the present disclosure, foam is used for filling the interior of the shell portion of the object. The foam may be biodegradable. Biodegradable foam may be made of water, vinegar, gelatin powder, glycerol, and/or sodium bicarbonate (baking soda). For example, in order to maintain structural integrity and shape for one kilogram load, 100 mL of water is combined with and 50 g of vinegar. The content is heated to a simmer and then 33 gms of gelatin powder and 4 gms of glycerol is added and the mixture stirring until the mixture thickens. Then 13.6 gms of sodium bicarbonate is added and mixed to make the mixture foam.

Figure 5:
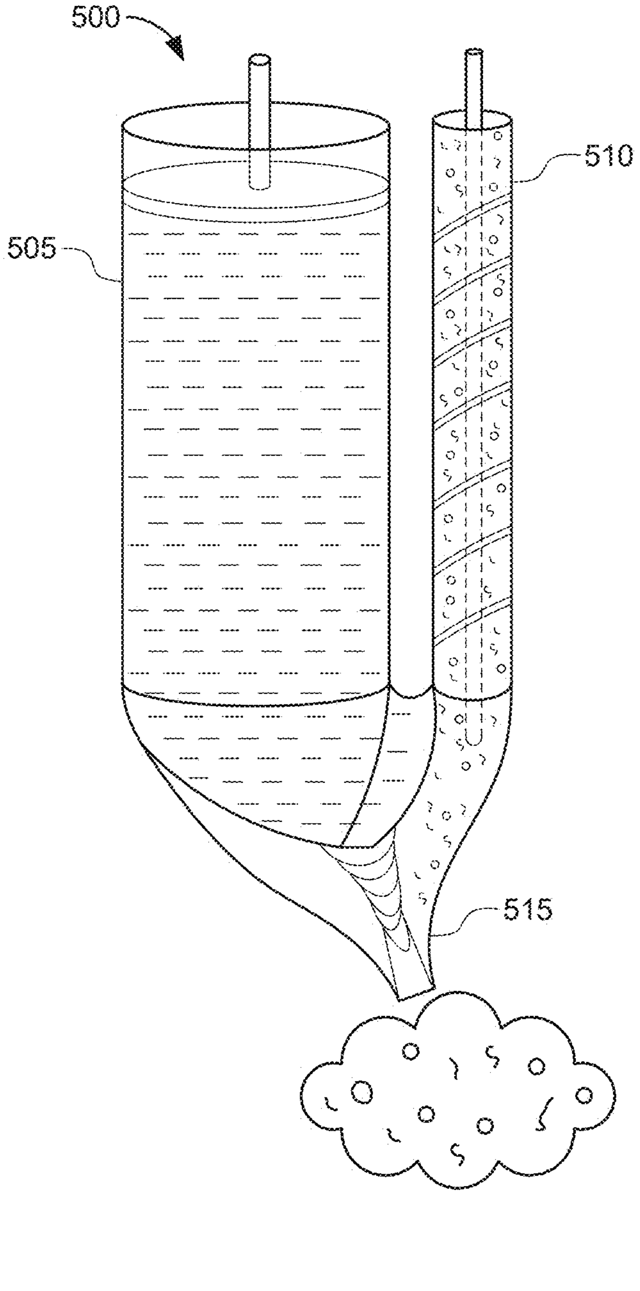
FIG. 5 depicts a custom mixing nozzle, in accordance with an embodiment of the present disclosure.

Further, in one embodiment of the present disclosure, a custom mixing nozzle is used to deposit the foam infill material in the interior of the shell portion. FIG. 5 depicts a custom mixing nozzle, in accordance with an embodiment of the present disclosure. As shown, the custom mixing nozzle 500 includes a first tube 505, a second tube 510 and a mixing zone 515 formed at a junction of the first tube 505 and the second tube 510. The first tube 505 includes a temperature-controlled syringe and the mixture of vinegar, glycerol, water, and gelatin is added in the first tube 505. Further the sodium bicarbonate is added in the second tube 510 and allowed to mix with the mixture of the first tube 505 in the mixing zone 515 of the custom mixing nozzle 500. The mixture forms the biodegradable foam which is used to deposit in the interior of the shell portion of the object. The biodegradable foam eliminates the need of plastic infill.

In another embodiment of the present disclosure, conductive foam is used as a foam infill material. Initially, a liquid metal (LM) is prepared by combining 68 wt % gallium, 22 wt % indium, and 10 wt % tin in a beaker. Then the mixture is heated on a hot plate to 300° C. until completely melted. After melting, the mixture is allowed to cool to room temperature. Then the LM is mixed with a desired quantity of expancel® microspheres, and blended. The resultant paste is either fed automatically or manually into a dispensing nozzle. That is, the paste is then extruded through a nozzle with a heated orifice. As the paste encounters the high heat (~300 deg C.) at the orifice, the microspheres expand to fill up the volume of the interior of the shell portion.

As described, the system and the method for additive manufacturing of an object disclosed in the present disclosure facilitate deposition of foam infill material during the manufacturing of the object and reduces the print time. In one embodiment, one or more nozzles may be used for depositing foams of different characteristics. For example, two nozzles may be used for depositing a lightweighting foam (weak, low-density, light weight foam) adjacent to structural foam (tough, high-density, higher weight foam) to give a 3D printed part a combination of strength and light weight at speeds faster than what is possible using an FDM printer alone. In another example, one nozzle may be used to deposit conductive foam while another nozzle may be used deposits electrically insulating and/or dielectric foam, this may be useful, for example, for fabrication of supercapacitors and batteries. Porous copper foam may be used for lithium-ion batteries, fuel cells and supercapacitors because of high thermal and electronic conductivity.

In some examples, options are provided to the user to select one or more locations at which the foam infill material needs to be deposited in the shell portion. Upon receiving a selection of a location from user, the shell portion is fabricated via a first nozzle, and the foam infill material is deposited via a second nozzle, and wherein the foam infill material is a foam. In some examples, the method may also include determining if an excess amount of the foam infill material has been deposited and deploying a material removal arm to remove the excess amount of the foam infill material.

In some examples, the system for additive manufacturing of an object includes a first nozzle to deposit body material to form a shell portion of the object, a second nozzle to deposit foam infill material inside an interior of the shell portion of the object, and a processor communicatively connected to a memory storing instructions. The instructions when executed by the processor, cause the processor to determine the shell portion of the object using the 3D model of the object, determine one or more locations in the shell portion for providing access to the interior of the shell portion determine an amount of the foam infill material needed to fill the interior of the shell portion, fabricate the shell portion of the object, deposit the amount of foam infill material at the one or more determined locations to fill the interior of the shell portion, and fabricate the shell portion of the object to complete fabrication of the object. The instructions when executed by the processor may also, determine a foam infill material for additive manufacturing based on one or more foam infill material characteristics. The system may also include a camera to provide positioning information associated with the first nozzle and the second nozzle and to enable quality control measures, a display component to display data associated with fabrication of the object, and a nozzle control unit to operate the first nozzle and the second nozzle for manufacturing the object. In some examples, the 3D model of the object is a three-dimensional (3D) rendering of the object and determining the shell portion includes determining a first set of spatial movement instructions for the first nozzle to follow to fabricate the shell portion of the object. In some examples, determining the one or more locations in the shell portion includes determining a second set of spatial movement instructions for the second nozzle to follow to deposit the foam infill material inside the interior of the object shell portion. The quality control measures enabled by the camera includes, determining, via image analysis, that an excess amount of foam infill material has been deposited. In some examples, the instructions, when executed by the processor, further cause the processor to utilize results of the image analysis to direct the material removal arm to remove the excess foam infill material. The quality control measures enabled by the camera further includes, determining, via image analysis, that no foam infill material is being deposited. The quality control measures enabled by the camera further includes, no foam infill material is being deposited at the time the excess material is being removed. In other words, quality control measures enabled by the camera includes controlling the deposition of the foam infill material, via the image analysis, to prevent foam infill material deposition during the removal of excess material. For example, during the printing process, the system 100 performs image analysis to ensure that the foam infill material is deposited and also ensures that no foam infill material is being deposited during removal of the excess foam infill material, if any. In some examples, the system may further include an inertial measurement unit (IMU) to sense movement of the first nozzle and the second nozzle to position the nozzles to fill the material.

The systems and methods described herein may also include a non-transitory computer readable storage media coupled to a processor and having instructions storing thereon which, when executed by the processor, cause the processor to perform operations for additive manufacturing of an object, the operations comprising determining a shell portion of the object using a 3D model of the object, including determining a first set of spatial movement instructions to fabricate the shell portion of the object, determining one or more locations in the shell portion for providing access to an interior of the shell portion, determining a foam infill material for additive manufacturing based on one or more fill material characteristics, determining an amount of the foam infill material needed to foam infill the interior of the shell portion, including determining second set of spatial movement instructions to deposit the foam infill material inside the interior of the object shell portion, partially fabricating the shell portion of the object according to the first set of spatial movement instructions using a first nozzle, depositing the amount of foam infill material at the one or more determined locations to fill the interior of the shell portion via the according to the second set of spatial movement instructions using a second nozzle, deploying a material removal arm to remove excess amount of the foam infill material, and fabricating the remaining shell portion of the object to complete fabrication of the object. In some examples, determining the amount of the foam infill material needed includes determining a volume of the interior of the shell portion of the object, and determining the amount of foam infill material based on the volume and an expansion rate of the foam infill material. Also, in some examples, determining the location in the shell portion includes identifying one or more locations with a time at which the fill material needs to be deposited, providing one or more locations as options to a user, and receiving a selection of a location from user. Alternatively, the user may input the location and the time for depositing the foam infill material inside the shell portion.

Figure 6:
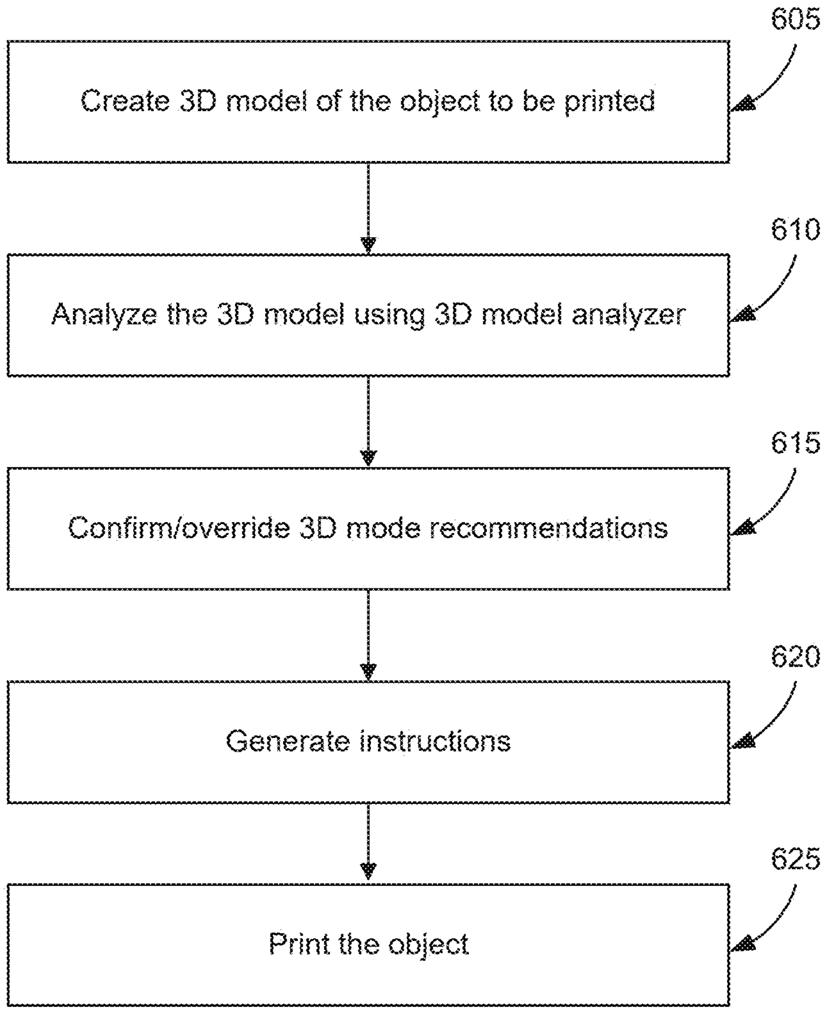
FIG. 6 is a flowchart illustrating the method of manufacturing an object with foam infill material, in accordance with an embodiment of the present disclosure.

FIG. 6 is a flowchart illustrating the method of manufacturing an object with foam infill material, in accordance with an embodiment of the present disclosure. As shown, at step 605, a 3D model of the object to be printed is created. In one embodiment, a user may create the 3D model of the object to be printed using the CAD tool 225, for example. Alternatively, any other 3D modelling tools may be used to generate the 3D model of the object.

Upon generating the 3D model, the 3D model is analyzed using the 3D model analyzer 230, as shown at step 610. In one embodiment, the 3D model analyzer 230 determines the shell portion of the object using the 3D model of the object and determines one or more locations in the shell portion for providing access to an interior of the shell portion. Further, the 3D model analyzer 230 determines a time at which the foam infill material needs to be deposited.

Upon determining, the one or more locations, the locations are displayed on a user interface enabling the user to select the one or more locations and also to input the foam infill material that needs to be filled. In a second embodiment, the user may define the one or more locations to fill the foam infill material. Hence, the user may confirm the system recommended locations or override the recommendations to choose a different location, as shown at step 615.

At step 620, the 3D model analyzer 230 generates the instructions to print the 3D object and to fill the foam infill material inside the interior of the 3D object. In one embodiment, the 3D model analyzer 230 generates the instructions (g-code), which includes foam infill settings, for the one or more nozzles (for example, the first nozzle 245 and the second nozzle 250). In one implementation, the user may input the material and nozzle details to the system to generate the instructions. For example, the user may specify that a second nozzle includes non-conductive foam, and a third nozzle includes conductive foam.

Upon generating the instructions, the instructions are inputted to the printing device 110 for printing the 3D object. As described, the instructions (the g-code file) may be transferred to the printing device 110 through one of the USB drive, memory card, or through any wired and/or wireless networks. Upon receiving the instructions, the printing device 110 prints the object by swapping the nozzles based on the instructions.

As described, the system and method disclosed in the present disclosure enables foam infill while printing the object using two or more nozzles. The disclosed method and system eliminate the need of excessive time and resources and reduces the production time and costs.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method for additive manufacturing of an object, the method comprising:

depositing, by a first nozzle, body material to form a shell portion of the object;

depositing, by a second nozzle, a foam infill material inside an interior of the shell portion of the object;

determining the shell portion of the object using a three-dimensional model (3D model) of the object;

determining one or more locations in the shell portion for providing access to an interior of the shell portion;

determining an amount of the foam infill material needed to fill the interior of the shell portion;

fabricating the shell portion of the object;

depositing the amount of the foam infill material at the one or more determined locations to fill the interior of the shell portion;

fabricating the shell portion of the object to complete fabrication of the object; and providing, by a camera, positioning information associated with the first nozzle and the second nozzle and to enable quality control measures, wherein the quality control measures enabled by the camera comprises, determining, via an image analysis, that an excess amount of the foam infill material has been deposited.

2. The method of claim 1, wherein determining the amount of the foam infill material needed comprises one or more of:

determining the foam infill material for additive manufacturing based on one or more foam infill material characteristics;

determining a volume of the interior of the shell portion of the object; and determining the amount of foam infill material based on the volume of the interior of the shell portion of the object and an expansion ratio of the foam infill material.

3. The method of claim 1, wherein determining the one or more locations in the shell portion comprises one or more of:

identifying for one or more locations and a time at which the foam infill material needs to be deposited; and providing one or more locations in the shell portion as options to a user; and receiving a selection of a location from user.

4. The method of claim 1, wherein the shell portion is fabricated via the first nozzle.

5. The method of claim 1, further comprising:

deploying a material removal arm to remove the excess amount of the foam infill material.

6. A system for additive manufacturing of an object, the system comprising:

a first nozzle to deposit body material to form a shell portion of the object;

a second nozzle to deposit a foam infill material inside an interior of the shell portion of the object;

a processor communicatively connected to a memory storing instructions, the instructions when executed by the processor, cause the processor to:

determine the shell portion of the object using the three-dimensional model of the object;

determine one or more locations in the shell portion for providing access to the interior of the shell portion;

determine an amount of a foam infill material needed to fill the interior of the shell portion;

fabricate the shell portion of the object;

deposit the amount of the foam infill material at the one or more determined locations to fill the interior of the shell portion; and fabricate the shell portion of the object to complete fabrication of the object;

a nozzle control unit to operate the first nozzle and the second nozzle for manufacturing the object; and a camera to provide positioning information associated with the first nozzle and the second nozzle and to enable quality control measures, wherein the quality control measures enabled by the camera comprises, determining, via an image analysis, that an excess amount of the foam infill material has been deposited.

7. The system of claim 6, wherein the processor communicatively connected to a memory storing instructions, the instructions when executed by the processor, cause the processor to perform one or more of:

determine a foam infill material for additive manufacturing based on one or more foam infill material characteristics;

determine a volume of the interior of the shell portion of the object; and determine the amount of foam infill material based on the volume of the interior of the shell portion of the object and an expansion ratio of the foam infill material.

8. The system of claim 6, wherein the system further comprises:

a material removal arm to remove the excess amount of the foam infill material.

9. The system of claim 6, wherein determining the shell portion comprises determining a first set of spatial movement instructions for the first nozzle to follow to fabricate the shell portion of the object.

10. The system of claim 6, wherein determining the one or more locations in the shell portion comprises determining a second set of spatial movement instructions for the second nozzle to follow to deposit the foam infill material inside the interior of the object shell portion.

11. The system of claim 6, wherein each of the first nozzle and the second nozzle comprises at least one force sensor to gain spatial feedback related to a position of the second nozzle.

12. The system of claim 6, wherein the instructions, when executed by the processor, further cause the processor to utilize results of the image analysis to direct a material removal arm to remove the excess foam infill material.

13. The system of claim 6, wherein the quality control measures enabled by the camera comprises, determining, via the image analysis, that no foam infill material is being deposited at the time the excess foam infill material is being removed.

14. The system of claim 7, wherein the one or more foam infill material characteristics include weight of the foam infill material, an expansion ratio of the foam infill material, a conductive characteristic of the foam infill material, a self-healing characteristic of the foam infill material, and a biodegradable characteristic of the foam infill material.

15. The system of claim 6, further comprising an inertial measurement unit (IMU) to sense movement of the first nozzle and the second nozzle to initiate deposition of the foam infill material and removal of the excess amount of foam infill material.

16. A non-transitory computer readable storage media coupled to a processor and having instructions storing thereon which, when executed by the processor, cause the processor to perform operations for additive manufacturing of an object, the operations comprising:

determining a shell portion of the object using a three-dimensional model of the object, including determining a first set of spatial movement instructions to fabricate the shell portion of the object;

determining one or more locations in the shell portion for providing access to an interior of the shell portion;

determining an amount of foam infill material needed to fill the interior of the shell portion, including determining a second set of spatial movement instructions to deposit the foam infill material inside the interior of the object shell portion;

fabricating the shell portion of the object according to the first set of spatial movement instructions using a first nozzle;

depositing the amount of the foam infill material at the one or more determined locations to fill the interior of the shell portion according to the second set of spatial movement instructions using a second nozzle;

deploying a material removal arm to remove excess amount of the foam infill material;

fabricating the shell portion of the object to complete fabrication of the object; and providing, by a camera, positioning information associated with the first nozzle and the second nozzle and to enable quality control measures, wherein the quality control measures enabled by the camera comprises, determining, via an image analysis, that an excess amount of the foam infill material has been deposited.

17. The non-transitory computer-readable storage medium of claim 16, wherein determining the amount of the foam infill material needed comprises one or more of:

determining a foam infill material for additive manufacturing based on one or more foam infill material characteristics;

determining a volume of the interior of the shell portion of the object; and determining the amount of foam infill material based on the volume of the interior of the shell portion of the object and an expansion ratio of the foam infill material.

18. The non-transitory computer-readable storage medium of claim 16, wherein determining the one or more locations in the shell portion comprises one or more of:

identifying for one or more locations and a time at which the foam infill material needs to be deposited;

providing one or more locations as options to a user; and receiving a selection of a location from user.

19. The method of claim 1, wherein results of the image analysis is utilized to direct the material removal arm to remove the excess foam infill material.

20. The method of claim 1, wherein the quality control measures enabled by the camera comprises, determining, via the image analysis, that no foam infill material is being deposited at the time the excess foam infill material is being removed.

* * * * *